United States Patent
Prenner et al.

(10) Patent No.: US 11,742,727 B2
(45) Date of Patent: Aug. 29, 2023

(54) METHOD AND DEVICE FOR DETERMINING A ROTOR TEMPERATURE VALUE FOR AN ELECTRIC MOTOR

(71) Applicant: ZF Friedrichshafen AG, Friedrichshafen (DE)

(72) Inventors: Franz Prenner, Friedrichshafen (DE); Oussama Jabloun, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/696,996

(22) Filed: Mar. 17, 2022

(65) Prior Publication Data

US 2022/0311313 A1 Sep. 29, 2022

(30) Foreign Application Priority Data

Mar. 26, 2021 (DE) ................ 10 2021 202 982.5

(51) Int. Cl.
*H02K 11/25* (2016.01)
*H02K 11/27* (2016.01)
*G01K 7/42* (2006.01)
*H02P 29/60* (2016.01)

(52) U.S. Cl.
CPC .............. *H02K 11/25* (2016.01); *G01K 7/42* (2013.01); *H02K 11/27* (2016.01); *H02P 29/60* (2016.02); *G01K 2205/00* (2013.01)

(58) Field of Classification Search
CPC ......... H02K 11/25; H02K 11/27; H02P 29/60; G01K 7/42; G01K 2205/00
(Continued)

(56) References Cited

U.S. PATENT DOCUMENTS 9,166,518 B2 10/2015 Campbell et al.
10,256,764 B2 4/2019 Lee
(Continued)

FOREIGN PATENT DOCUMENTS

DE 10 2012 209 036 A1 12/2012
DE 10 2014 213 103 A1 1/2016
(Continued)

OTHER PUBLICATIONS

DE 4138066 A1 "Adjusting Process Parameter Dependent on Changing Operating State—Estimating Value of Changing Parameter and Simultaneously Calculating Max" Date Published:Mar. 19, 1992 Inventor Information Name: Schierling Hubert Dr Ing (Year: 1992).*

(Continued)

*Primary Examiner* — Jorge L Carrasquillo
(74) *Attorney, Agent, or Firm* — FINCH & MALONEY, PLLC (57) ABSTRACT

Disclosed is a method for determining a rotor temperature value $T_{Rot}$ for an electric machine, such as an electric motor. In one example, the method includes calculating a support value $P_{cu2\_Trot}$ using a rotor temperature value $T_{rot}$ that is determined with a temperature model and a motor current value $I_{sdq}$. An auxiliary value $P_{cu2\_Ref}$ can be determined using a motor torque $T_{rq}$ and a motor slip value $\omega_{slip}$. The support value $P_{cu2\_Trot}$ can be linked with the auxiliary value $P_{cu2\_Ref}$ in order to obtain a corrected rotor temperature value $Delta_{Trot}$. Furthermore, the temperature model can be modified using the corrected rotor temperature value $Delta_{Trot}$ in order to obtain a corrected temperature model. Finally, the rotor temperature value $T_{Rot}$ can be determined using the corrected temperature model.

13 Claims, 5 Drawing Sheets

(58) Field of Classification Search
USPC .................................... 318/400.08; 361/23
See application file for complete search history.

(56) References Cited

U.S. PATENT DOCUMENTS

| | | | |
|---|---|---|---|
| 11,128,253 B1* | 9/2021 | Colby | ................. H02P 29/66 |
| 2006/0250154 A1* | 11/2006 | Gao | ................. H02H 6/005 |
| | | | 324/765.01 |

FOREIGN PATENT DOCUMENTS

| | | |
|---|---|---|
| EP | 3 806 323 A1 | 4/2021 |
| WO | 2016/050811 A1 | 4/2016 |

OTHER PUBLICATIONS

CN 111092579 A "Online Stator Temperature Monitoring Adaptive Asynchronous Motor Vector Control System, Has Monitoring Online Stator Winding Temperature According to Stator Resistor Identification Result Correction" Date Published:May 1, 2020 Inventor Name: Li X (Year: 2020).*
JP 2021065071 A "Induction Motor Control Device and Control System" Date Published:Apr. 22, 2021 Inventor Information Name: Ito Yoshiaki (Year: 2021).*
CN 107294449 A "A Model-based Predictive Control of Induction Motor Temperature Identification Method" Date Published: Oct. 24, 2017 Inventor Information Name: Wang, Li-guo (Year: 2017).*
German Patent Office, Search Report issued for German Patent Application No. 10 2021 202 982.5 (dated Oct. 26, 2021).

\* cited by examiner

Fig. 8

METHOD AND DEVICE FOR DETERMINING A ROTOR TEMPERATURE VALUE FOR AN ELECTRIC MOTOR

RELATED APPLICATIONS

This application claims the benefit of and right of priority under 35 U.S.C. § 119 to German Patent Application no. 10 2021 202 982.5, filed on Mar. 26, 2021, the contents of which are incorporated herein by reference in its entirety.

FIELD OF THE DISCLOSURE

The present invention relates to a method and a device for determining a rotor temperature value for an electric machine, in accordance with the present disclosure.

BACKGROUND

For modeling the temperature behavior of electric machines, thermal models with concentrated parameters are often used. For this the electric machine is divided into different components, which are then regarded as homogeneous bodies. Each of these bodies has a thermal capacity of its own. The thermal capacity indicates how much energy is needed in order to change the temperature of a body by 1 degree Celsius. Between the individual bodies there is a thermal resistance, which is a measure for the heat flux flowing due to temperature differences. Thermal processes can be pictured analogously to electrical networks by means of equivalent circuits. Depending on the number of components modeled, one speaks of single-body, two-body or multi-body modeling.

SUMMARY

Against that background the present invention provides a better method for determining a rotor temperature value for an electric machine, in accordance with the present disclosure. Advantageous design features emerge from the claims and from the description given below.

With the method described herein, a temperature model for monitoring motor temperatures and for de-rating functions can be improved. In this case, the thermal model can be kept particularly simple in order to make optimum use of limited computing resources in the target hardware. Particularly in an application for automobiles, the method can contribute toward dynamic correction of initialization errors after a terminal status change in a thermal ASM rotor model.

A method is described for determining a rotor temperature for an electric machine, wherein the method comprises a step of calculating a support value using a rotor temperature value determined with a temperature model and a motor current value, and also a step of determining an auxiliary value using a motor torque and a motor slip value. In addition the method comprises a step of linking the support value with the auxiliary value in order to obtain a corrected rotor temperature value, a step of modifying the temperature model using the corrected rotor temperature value in order to obtain a corrected temperature model, and a step of determining the rotor temperature value using the corrected temperature model.

For example, the electric machine can be a drive motor (such as an asynchronous motor) of a vehicle, for example a truck. In that case the machine can comprise a movable rotor which, when the machine is operated, can rotate in a stator that surrounds the rotor. To avoid the cost of fitting a sensor onto the moving parts of the motor, the motor temperature can be calculated by means of a temperature model. For that purpose important values on which the motor model is based, such as the motor torque $T_{rq}$ or its slipping frequency $\omega_{slip}$, a coolant temperature $T_{cooling}$, a stator temperature $T_{stat}$ or a power loss $P_v$ can be stored offline for calculating the rotor temperature $T_{rot}$ by means of the temperature model. A deviation of such starting values, for example after a fresh start or a terminal status change of the vehicle, can be determined by the method introduced here, whereby in an advantageous manner initialization errors that occur can be corrected. Such deviations can occur for example after a short pause during which the motor is temporarily switched off, but the time is not long enough for complete cooling to take place. In this case for example the stator can cool more rapidly than the rotor that is rotating during operation. After a fresh start, i.e. when the vehicle is started up again, for example after a rest break for the driver, it can happen that the stator temperature is no longer the same as the rotor temperature and the temperature model has to be adapted. For that, with the method proposed here on the one hand an auxiliary value can be determined, which can also be called a reference value and can be calculated from the data stored offline on the motor torque and the motor slippage. In other words, this reference calculation is for example based on the voltage model of the electric machine or the asynchronous motor. On the other hand, a support value can be calculated, which is based on the rotor temperature estimated from the temperature model and a known motor current value. In a subsequent step of the method, the auxiliary value and the support value can be compared with one another in order to obtain a corrected rotor temperature value. That corrected rotor temperature value can then be used to correct the temperature model and thereby to determine the actual rotor temperature advantageously, for example with a maximum deviation of 10° C. compared with the actual temperature.

According to an embodiment, in the linking step the support value is subtracted from the auxiliary value in order to obtain an error value. For example, in this step one can use the formula $e = P_{cu2\_Ref} - P_{cu2\_Trot}$ in which the variable e is the error value and $P_{cu2\_Ref}$ is the auxiliary value and $P_{cu2\_Trot}$ is the support value. In this case the error, e, can be attributed to an incorrect estimate of rotor temperature. Advantageously, the error value can in that way be determined by a simple and resource-sparing computation method.

According to a further embodiment, in the linking step the corrected rotor temperature value can be determined using a regulator, which can use the error value as an input parameter. For example, from a difference between the support value and the auxiliary value an error value can be calculated, which can be used as an input parameter for the regulator. Using this error value, the regulator, which for example can be a simple proportional regulator, can be corrected. Advantageously, owing to the integrating behavior of the route, there is no need for a more complex PI regulator. The regulator can be connected promptly directly after a terminal status change and can, for example after an adjustable time, be set more slowly or switched off completely. Advantageously, the temperature model can be corrected precisely and quickly with the help of the regulator.

According to a further embodiment, in the determination step the torque can be calculated using a scaling factor $p_z$ and additionally or alternatively a magnetic flux magnitude $\psi$ and a current value I, in particular using the formula $T_{rq} = \frac{3}{2} \cdot p_z (\psi_{s\alpha} I_{s\beta} - \psi_{s\beta} I_{s\alpha})$. In this, $\psi_{s\alpha}$ can represent a magnetic flux magnitude in the stator in the direction $\alpha$ and $I_{s\beta}$ can represent a current value in the stator in the direction β. Also, $I_{s\beta}$ can represent a magnetic flux magnitude in the stator in the direction β and $I_{s\alpha}$ can represent a current value in the stator in the direction α. For example, the torque can be obtained from the machine regulator on the basis of the voltage model of the motor. In this case the calculation of the torque can be carried out on the basis of voltage equations, as follows:

$$\psi_{s\alpha} = \int (U_{s\alpha} - R_s I_{s\alpha}) \cdot dt$$

$$\psi_{s\beta} = \int (U_{s\beta} - R_s I_{s\beta}) \cdot dt$$

Advantageously, the auxiliary value can be calculated independently of rotor variables, including the rotor resistance. For a more precise calculation of the copper losses, the stator resistance can be related as a function of the stator temperature.

In a further embodiment, in the calculation step, the support value can be calculated using a rotor resistance $R_r$ and a first rotor current value $I_{rd}$ and a second rotor current value $I_{rq}$, in particular using the formula $P_{cu2Trot} = 3/2 \cdot R_r (I_{rd}^2 + I_{rq}^2)$. In this expression, the first rotor current value $I_{rd}$ can correspond to a first current component in the dq-coordinate system of the rotor and the second rotor current value $I_{rq}$ can correspond to a second current component in the dq-coordinate system of the rotor. Here, both the first and also the second current value can be Park-transformed. Advantageously, with this formula the rotor copper losses can be determined as a function of the rotor temperature.

In a further embodiment, in the calculation step the rotor resistance can be calculated using a basic electrical resistance value in the rotor $R_{r20}$ and an adaptation factor, in particular wherein the adaptation factor can be calculated using a scaling value $\alpha_r$ and the rotor temperature value $T_{rot}$, in particular wherein the rotor resistance can be calculated using the formula $R_r = R_{r20}(1 + \alpha_r (T_{rot} - 20))$. For example, the basic resistance can correspond to a rotor resistance at a rotor temperature of 20° C. and the scaling value can correspond to a temperature coefficient of the rotor. This has the advantage that the rotor resistance can be calculated as precisely as possible with the help of the estimated rotor temperature.

According to a further embodiment, in the calculation step the support value can be calculated using a main inductance $L_m$ and a rotor inductance $L_r$, in particular wherein a ratio of the main inductance to the rotor inductance can be calculated from characteristic curves and additionally or alternatively from current values in the stator $I_{sd}$ and $I_{sq}$. For example, the main inductance $L_m$ can correspond to the inductance of the motor as a whole or the machine as a whole and the current values $I_{sd}$ and $I_{sq}$ can in each case correspond to a dq-current-component (i.e. the current component in the dq-coordinate system) of the stator. Advantageously, this can contribute toward obtaining the support value as precisely as possible.

According to a further embodiment, in the calculation step, the second rotor current $I_{rq}$ can be calculated using the main inductance $L_m$ and the rotor inductance $L_r$ and a current $I_{sq}$ in the stator, in particular using the formula $I_{rq} = -(L_m/L_r) \cdot I_{sq}$. Advantageously, the value of the second rotor current required for calculating the support value can thus be calculated on the basis of known values.

Furthermore, in a further embodiment, in the calculation step the first rotor current Ira can be calculated using the rotor inductance $L_r$ and a magnetic flux magnitude $\psi_{rd}$ in the rotor and the main inductance $L_m$ and a current $I_{sd}$ in the stator, in particular using the formula $I_{rd} = (1/L_r)(\psi_{rd} - L_m I_{sd})$.

Here, $\psi_{rd}$ can correspond to a d-component of the rotor flux concatenation. In this case the d-component of the rotor current, which flows only transiently during changes of $\psi_{rd}$, can be disregarded. Such a procedure has the advantage that the second rotor current and following therefrom also the support value can be calculated as precisely as possible.

According to a further embodiment, in the determination step the auxiliary value can be determined by multiplying the torque by the motor slip angle. For example, here the formula $P_{cu2Ref} = T_{rq} \cdot \omega_{slip}$ can be used. Advantageously, the auxiliary value can thus be determined using a simple and resource-sparing computation method based on known values.

The approach presented here also involves a device designed to carry out, control, and implement the steps of a variant of a method presented herein, using appropriate equipment. Also, with this variant of the invention in the form of a device, the stated objective of the invention can be achieved quickly and efficiently.

A device can be an electric unit which processes electric signals, for example sensor signals, and emits control signals as a function thereof. The device can comprise one or more suitable interfaces, which can be designed in the form of hardware and/or software. In a hardware design the interfaces can for example be part of an integrated circuit in which functions of the device are implemented. The interfaces can also be individual integrated circuits or can consist at least in part of discrete structural elements. In a software design the interfaces can be software modules, for example present in a microcontroller in addition to other software modules.

Also advantageous is a computer program product with program codes, which can be stored on a machine-readable support such as a semiconductor memory, a hard disk memory or an optical memory, and which is used for carrying out the method in accordance with one of the above-described embodiments when the program is run on a computer or a suitable device.

BRIEF DESCRIPTION OF THE DRAWINGS

An example of the invention is explained in greater detail with reference to the attached drawings, which show.

DETAILED DESCRIPTION

In the following description of preferred example embodiments of the present invention, the elements shown in the various figures which function in similar ways are denoted by the same or similar indexes, so there is no need for repeated descriptions of the said elements.

Figure 1:
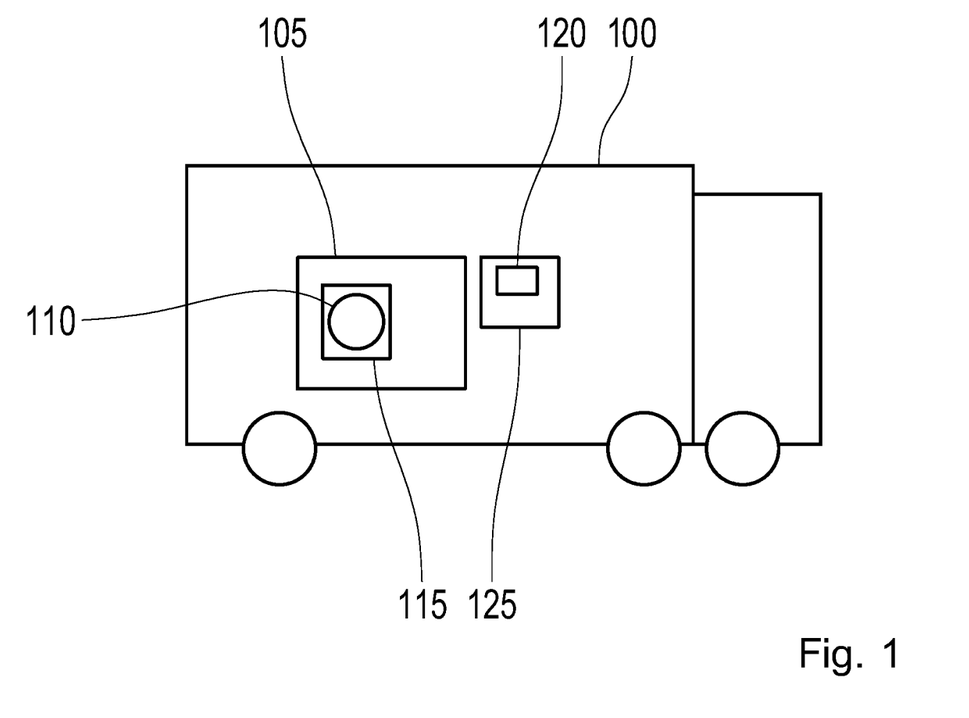
FIG. 1: A schematic representation of a vehicle with an electric machine, for which a variant described herein, of an example embodiment of a method for determining a rotor temperature value, can be used.

FIG. 1 shows a schematic representation of a vehicle 100 with an electric machine 105, according to an embodiment. Only as an example, the vehicle 100 is a truck with overall weight 12 tonnes, which has as its drive motor an electric machine, in this case for example an asynchronous motor. In this example embodiment, the asynchronous motor comprises a rotor 110 and a stator 115, whose temperatures can be calculated by means of a temperature model 120 of a device 125. This calculated temperature can then, for example, be used for further control tasks of the electric machine 105, such as in order to avoid overheating of the electric machine 105 during operation, which however, is not the central focus of the approach presented here and will not therefore be discussed further at this time. In this example embodiment, the solution of individual differential equations of the temperature model 120 has the general form $T(t) = \Delta P_V \cdot R_W (1 - e^{(t/R_w C_w)}) + T_0$. In this, solely as an example, $T_0$ represents the initial value of the temperature to be estimated.

Simple thermal networks have inherent correction properties by virtue of thermal compensation processes whose result is that any brief temperature falsifications diminish. The duration of such compensation processes is in the range of the thermal time constant $T_w = R_w \cdot C_w$. Thus, such compensation processes are fairly slow. A simulated driving cycle with a 12-tonne truck on a hilly stretch shows that the rotor temperature limit is reached within a few minutes after a cold start. Specific operating boundary conditions, such as variations of the ambient and the coolant temperature, varying loads and driving profiles, or frequent terminal status changes in the vehicle, demand rapid correction preferably within a few seconds in order to be able to ensure component protection and availability.

Figure 2:
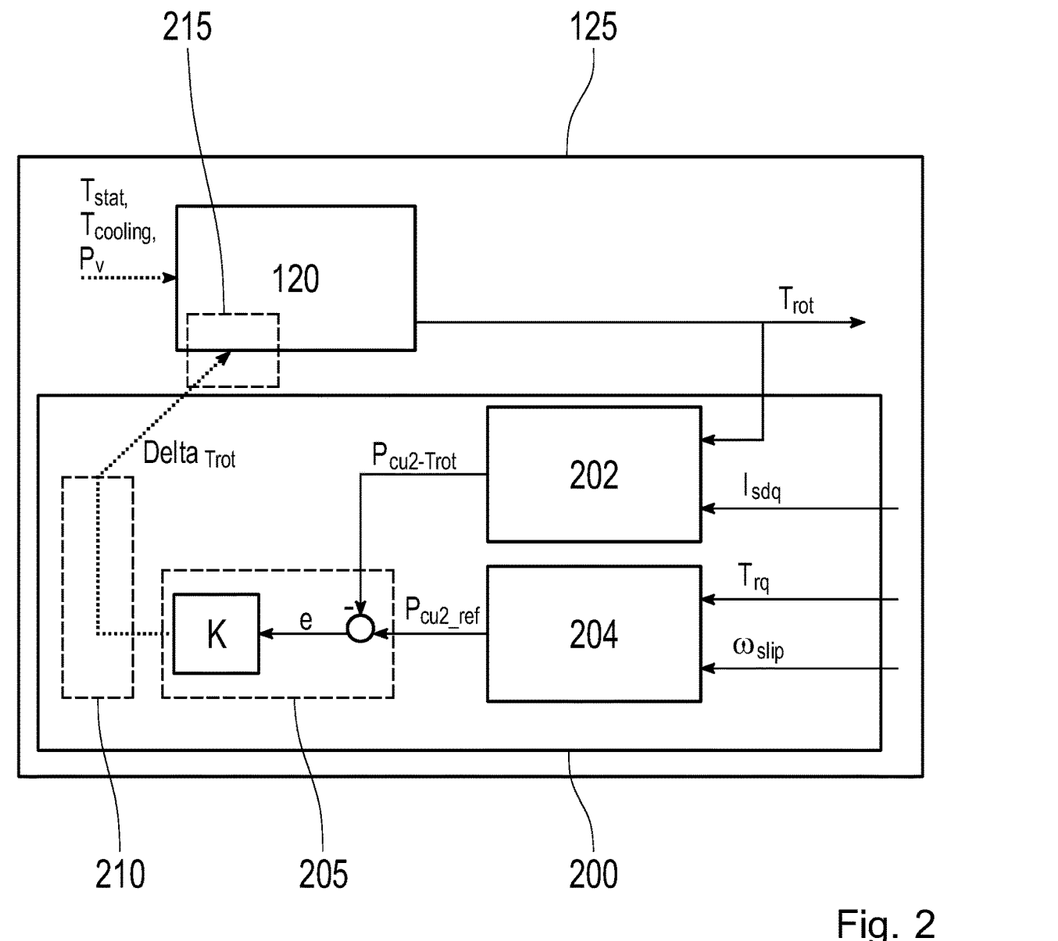
FIG. 2: A schematic representation of an example embodiment of a device for controlling a method for determining a rotor temperature for an electric machine.

FIG. 2 shows a schematic representation of an example embodiment of a device 125 for controlling a method for determining a rotor temperature value for an electric machine as described in the preceding FIG. 1. The device 125 represented in this case corresponds or is similar to the device described in the preceding FIG. 1. In this example embodiment, the device 125 is designed to control a method as described in the next FIG. 3. For that purpose, the device 125 comprises a temperature model 120, which in the context of use in an asynchronous motor can also be called an ASM temperature model. By means of the temperature model 120, using known values such as the coolant temperature $T_{cooling}$, the stator temperature $T_{stat}$ and the power loss Pv of the electric machine, a rotor temperature $T_{rot}$ can be calculated. For the precise calculation of a rotor temperature value $T_{rot}$ in the event of a change of operating boundary conditions such as ambient temperature, coolant temperature, varying loads and driving profiles, or frequent terminal status changes, or to correct the calculated temperature value within a few seconds, in this example embodiment the device 125 comprises a rotor temperature correction module 200. The rotor temperature correction module 200 comprises a calculation unit 202 for calculating a support value $P_{cu2}$ using the rotor temperature $T_{rot}$ and a motor current value $I_{sdq}$. In addition, the rotor temperature correction module 200 comprises a determination unit 204 for determining an auxiliary value $P_{cu2\_ref}$ using a motor torque $T_{rq}$ and a motor slip value $\psi_{slip}$. Both the support value $P_{cu2}$ and the auxiliary value $P_{cu2\_ref}$ indicate a calculated rotor copper loss or a heat loss performance of the rotor, wherein the auxiliary value $P_{cu2\_ref}$ represents a reference value whose reference calculations are based on the electric machine. The two values $P_{cu2}$ and $P_{cu2\_ref}$ can be linked with one another in a linking unit 205 of the rotor temperature correction module 200, so that, only as an example, the support value $P_{cu2}$ can be subtracted from the auxiliary value $P_{cu2\_ref}$. In this example embodiment, an error value e can be determined from the difference between the two values. This error value e can be attributed to a falsification of the estimated temperature $T_{rot}$ and can be corrected with the help of a simple proportional regulator. Owing to the integrating behavior of the route, for example no PI regulator is needed in this case. In this example embodiment, the regulator K can be connected "promptly" directly after a terminal status change and after an adjustable time can be set more slowly or switched off. The rotor temperature correction module 200 also comprises a modification unit 210, which is designed, using the emitted temperature correction value Delta$_{Trot}$, to modify or correct the temperature model 120.

By means of a determination unit 215, using the corrected temperature model 120, in turn the rotor temperature value $T_{rot}$ can be determined by the device 125.

Figure 3:
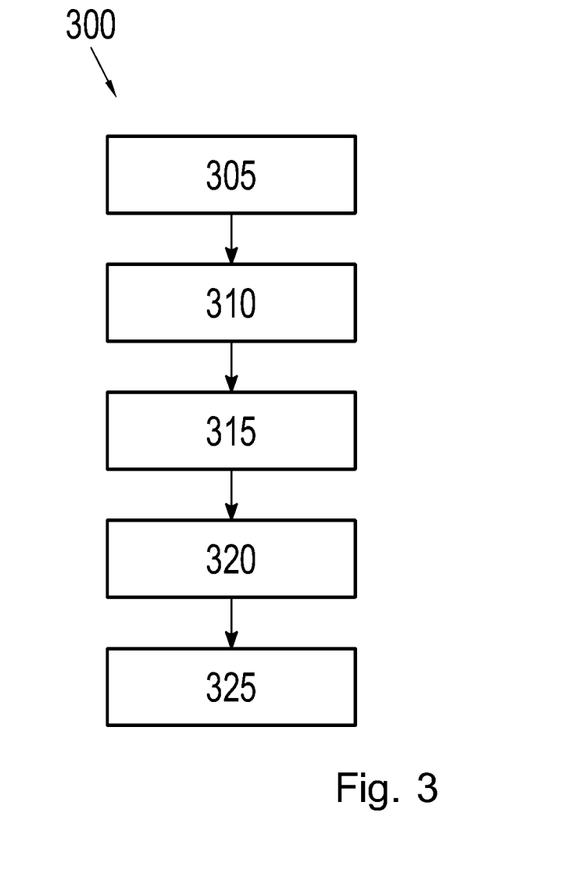
FIG. 3: A flow chart of an example embodiment of a method for determining a rotor temperature for an electric machine.

FIG. 3 shows a flow chart of an example embodiment of a method 300 for determining a rotor temperature value for an electric machine, as described in the preceding FIG. 1. The method 300 can be controlled or carried out by a device as described in the preceding FIG. 2. Correspondingly, the method 300 comprises a step 305 of calculating a support value using a rotor temperature value determined with a temperature model and a motor current value. Only as an example, in the calculation step 305 the calculation of the support value takes place using a rotor resistance $R_r$, a first rotor current value $I_{rd}$, and a second rotor current value $I_{rq}$. In this example embodiment the rotor copper losses are calculated as a function of the rotor temperature by the formula $P_{cu2\_Trot} = 3/2 \cdot R_r (I_{rd}^2 + I_{rq}^2)$. Only optionally, the rotor resistance $R_r$ is calculated using a basic electrical resistance value in the rotor $R_{r20}$ and an adaptation factor. In this example embodiment the adaptation factor is calculated using a scaling value $\alpha_r$ and the rotor temperature value $T_{rot}$ using the formula $R_r = R_{r20}(1 + \alpha_r(T_{rot} - 20))$. Thus, for example, the rotor resistance is calculated with the help of the estimated rotor temperature. Furthermore, only as an example, the rotor currents are calculated using the main inductance $L_m$ and the rotor inductance $L_r$. For this, only as an example, the second rotor current $I_{rq}$ is calculated using the main inductance $L_m$ and the rotor inductance $L_r$ and a current in the stator $I_{sq}$, using the formula $I_{rq} = -(L_m/L_r)I_{sq}$. In this example embodiment the first rotor current $I_{rd}$ is calculated using the rotor inductance $L_r$ and a magnetic flux magnitude $\psi_{rd}$ in the rotor and the main inductance $L_m$ and a current $I_{sd}$ in the stator, by means of the formula $I_{rd} = 1/L_r (\psi_{rd} - L_m I_{sd})$.

In addition, the method 300 comprises a step 310 of determining an auxiliary value using a motor torque and a motor slip value. In this determining step 310, only as an example the auxiliary value is determined by multiplying the torque by the motor slip angle. In other words, in this example embodiment the rotor copper losses are determined on the basis of the torque and the slip, using the formula $P_{cu2\_Ref} = T_{rq} \cdot \omega_{slip}$. Here, for example, the torque is optionally calculated using a scaling factor $p_z$ and a magnetic flux $\psi$ and a current I. For that purpose, in this example embodiment the formula $T_{rq} = 3/2(p_z) \cdot (\psi_{s\alpha} I_{s\beta} - \psi_{s\beta} I_{s\alpha})$ is used, wherein, only as an example, $\psi_{s\alpha}$ represents a magnetic flux magnitude in the stator in the direction $\alpha$ and $I_{s\beta}$ represents a current in the stator in the direction $\beta$ and wherein $\psi_{s\beta}$ represents a magnetic flux magnitude in the stator in the direction β and $I_{s\alpha}$ represents a current in the stator in the direction α.

Following the calculation step 305 and the determination step 310, the method 300 comprises a step 315 of linking the support value with the auxiliary value, in order to obtain a rotor temperature correction value. In this example embodiment, only as an example in the linking step 315 the support value is subtracted from the auxiliary value in order to obtain an error value. In other words, with the calculated rotor losses $P_{cu2\_Ref} = T_{rq} \cdot \omega_{slip}$ and $P_{cu2\_Trot} = \frac{3}{2} \cdot R_{r20}(1 + \alpha_r(T_{rot} - 20)) \cdot (L_m/L_r)^2 \cdot I_{rq}^2$ an error $e = P_{cu2\_Ref} - P_{cu2\_Trot}$ is calculated. In this example embodiment, that error is attributed to a falsification of the estimated temperature $T_{rot}$ and is corrected with the help of a simple proportional regulator.

There follows a step 320 of varying the temperature model using the corrected temperature value in order to obtain a corrected temperature model, and a step 325 of determining the rotor temperature value using the corrected temperature model.

In other words, an important aspect for applying the method 300 is to use various calculation methods for rotor copper losses in order to detect errors. A reference calculation based on the voltage model of the electric machine. A second calculation of $P_{cu2\_Trotor}$ based on the estimated rotor temperature $T_{rot}$. In a final step, the difference between the two calculations is corrected in the thermal model by means of a regulator K.

Figure 4:
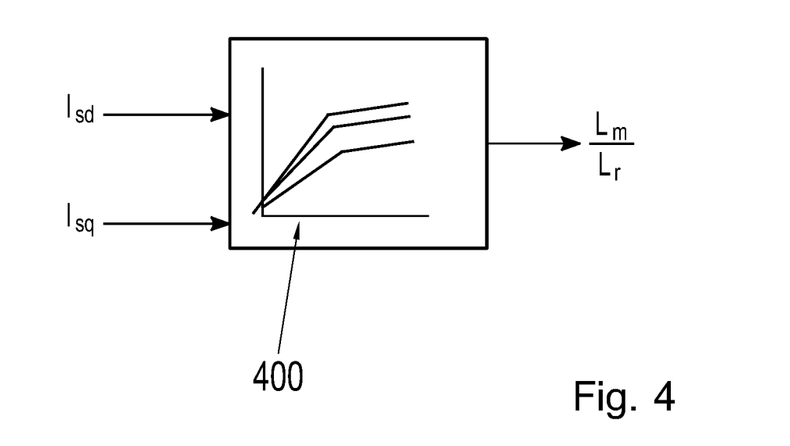
FIG. 4: A schematic representation of an example embodiment of a saturation behavior in the main inductance Lm and rotor inductance Lr of the electric machine, with the help of characteristic curves.

FIG. 4 shows a schematic representation of an example embodiment of the saturation behavior in the main inductance $L_m$ and the rotor inductance $L_r$ of the electric machine with the help of characteristic curves 400. The saturation behavior of the main inductance $L_m$ and the rotor inductance $L_r$, shown here with the help of characteristic curves as a function of $I_{sd}$ and $I_{sq}$, can be taken into account in step 305 of the method described in the preceding FIG. 3. In this example embodiment the support value is calculated using the main inductance $L_m$ and the rotor inductance $L_r$, wherein solely as an example a ratio of the main inductance to the rotor inductance is calculated as a function of characteristic curves and currents $I_{sd}$ and $I_{sq}$ in the stator. In that way the second calculation of the rotor copper losses is simplified to:

$$P_{cu2\_Trot} = \frac{3}{2} \cdot R_{r20}(1 + \alpha_r(T_{rot} - 20)) \cdot (L_m/L_r)^2 \cdot I_{rq}^2.$$

Figure 5:
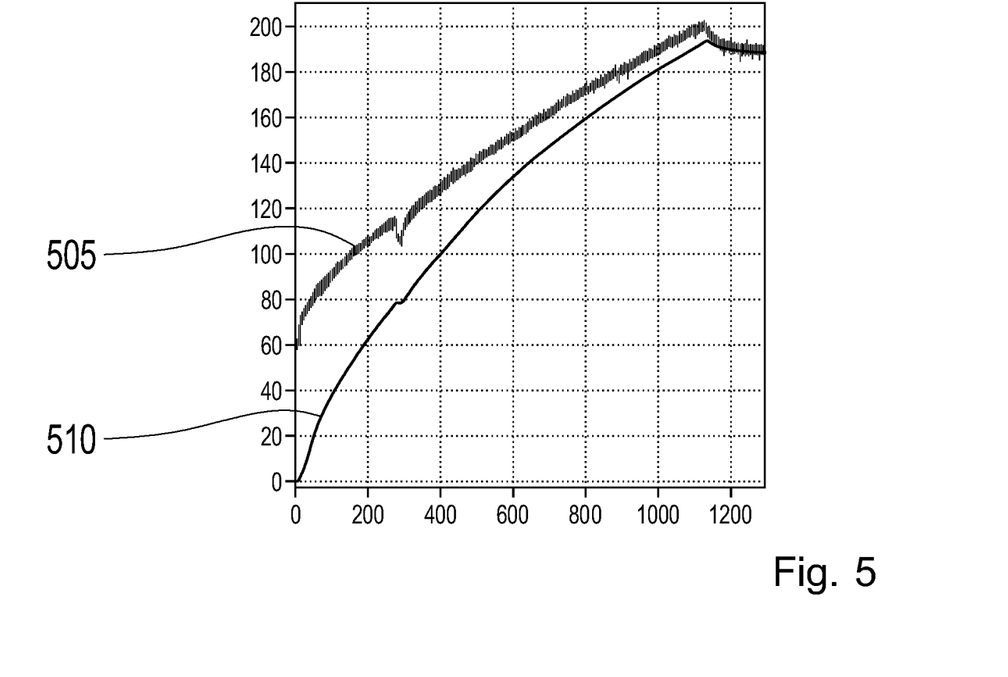
FIG. 5: A schematic representation of a measured rotor temperature and an estimated rotor temperature.

FIG. 5 shows a schematic representation of a measured rotor temperature and an estimated rotor temperature. In the representation shown here, no method was used for determining a rotor temperature value, such as described in the earlier FIG. 3. Correspondingly, a first rotor temperature curve 505, which corresponds to the measured rotor temperature, deviates from a second rotor temperature 510, which corresponds to the estimated rotor temperature.

Figure 6:
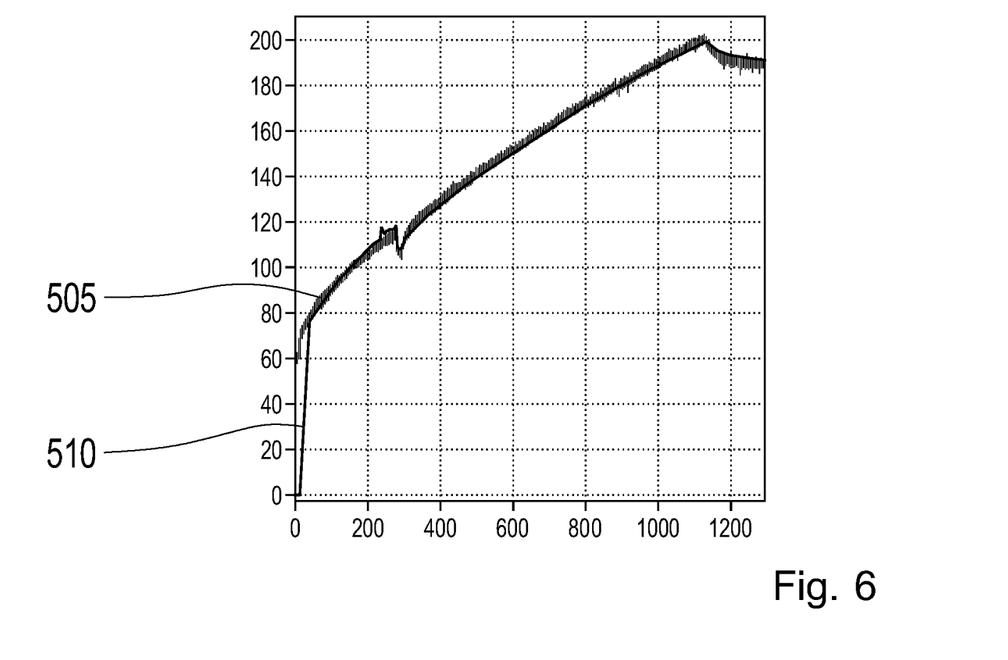
FIG. 6: A schematic representation of a measured rotor temperature and an estimated rotor temperature.

FIG. 6 shows a schematic representation of a measured rotor temperature and an estimated rotor temperature. In the representation shown here, the method for determining a rotor temperature value was used, such as described in the earlier FIG. 3. Correspondingly, the deviation of the first rotor temperature curve 505 from the second rotor temperature curve 510 is only minimal.

Figure 7:
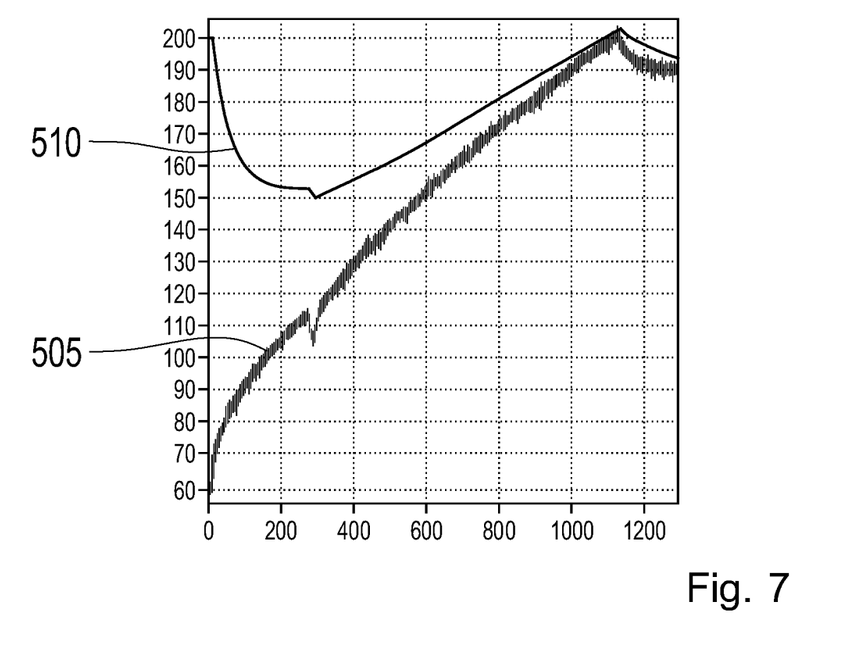
FIG. 7: A schematic representation of a measured rotor temperature and an estimated rotor temperature.

FIG. 7 shows a schematic representation of a measured rotor temperature and an estimated rotor temperature. In the representation shown in this case, no method was used for determining a rotor temperature value, such as described in the earlier FIG. 3. Correspondingly, the first rotor temperature curve 505 deviates from the second rotor temperature curve 510.

Figure 8:
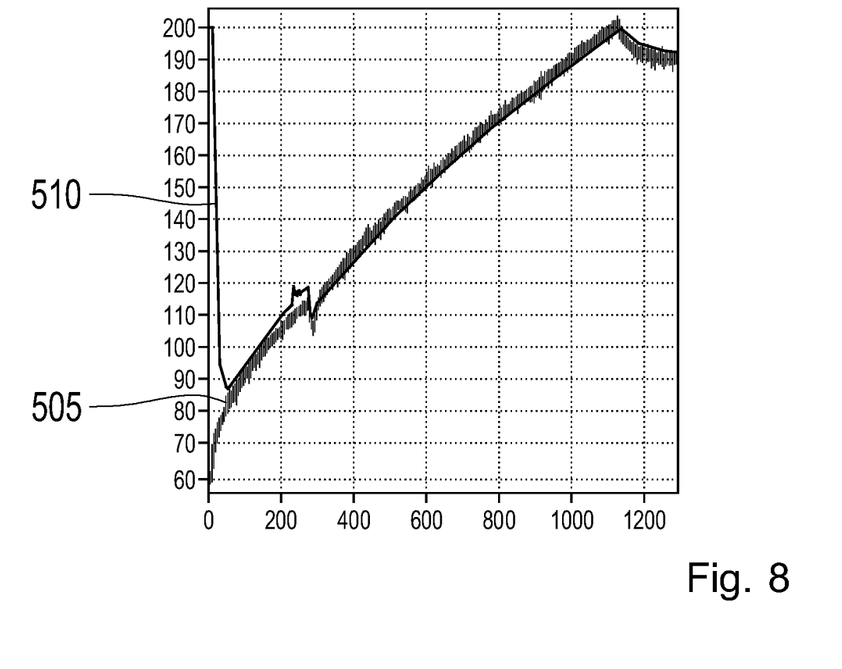
FIG. 8: A schematic representation of a measured rotor temperature and an estimated rotor temperature.

FIG. 8 shows a schematic representation of a measured rotor temperature and an estimated rotor temperature. In the representation shown here the method for determining a rotor temperature value was used, such as described in the earlier FIG. 3. Correspondingly, the deviation of the first rotor temperature curve 505 from the second rotor temperature curve 510 is only minimal.

The example embodiments described and illustrated by the figures are chosen only as examples. Different example embodiments can be combined with one another completely or in relation to individual features. Moreover, one example embodiment can be supplemented by features adopted from another example embodiment.

Furthermore, method steps according to the invention can be repeated and carried out in a sequence other than that described.

If an example embodiment contains an "and/or" link between a first feature and a second feature, this can be understood to mean that one form the example embodiment comprises both the first feature and the second feature, whereas another form comprises either only the first feature or only the second feature.

INDEXES

100 Vehicle
105 Electric machine
110 Rotor
115 Stator
120 Temperature model
125 Device
200 Rotor temperature correction module
202 Calculation unit
204 Determination unit
205 Linking unit
210 Modification unit
215 Determination unit
300 Method
305 Calculation step
310 Determination step
315 Linking step
320 Modification step
325 Determination step
400 Characteristic curves
505 First rotor temperature curve
510 Second rotor temperature curve
ASM Asynchronous machine
Delta$_{Trot}$ Corrected rotor temperature value
e Error value
$I_{sdq}$ Motor current
$I_{sd}$, $I_{sq}$ Currents in the stator
K Regulator
$L_m$ Main inductance
$L_r$ Rotor inductance
$P_{cu2\_Ref}$ Auxiliary value
$P_{cu2\_Trot}$ Support value
Pv Power loss
$T_{cooling}$ Coolant temperature
$T_{stat}$ Stator temperature
$T_{rot}$ Rotor temperature
$T_{rq}$ Motor torque
$\omega_{slip}$ Motor slip

The invention claimed is:

1. A method for determining a rotor temperature value ($T_{rot}$) for an electric machine, wherein the method comprises:

calculating a support value ($P_{cu2\_Trot}$) using a rotor temperature value ($T_{rot}$) determined with a temperature model, and a motor current value ($I_{sdq}$);

determining an auxiliary value ($P_{cu2\_Ref}$) using a motor torque ($T_{rq}$) and a motor slip value ($\omega_{slip}$);

linking of the support value ($P_{cu2\_Trot}$) with the auxiliary value ($P_{cu2\_Ref}$) in order to obtain a corrected temperature value ($\text{Delta}_{Trot}$);

modifying the temperature model, using the corrected temperature value ($\text{Delta}_{Trot}$) in order to obtain a corrected temperature model; and determining the rotor temperature value ($T_{rot}$) using the corrected temperature model.

2. The method according to claim 1, wherein in the linking step the support value ($P_{cu2\_Trot}$) is subtracted from the auxiliary value ($P_{cu2\_Ref}$) in order to obtain an error value (e).

3. The method according to claim 2, wherein in the linking step the corrected rotor temperature value ($\text{Delta}_{Trot}$) is determined using a regulator (K), which uses the error value (e) as the input parameter.

4. The method according to claim 1, wherein in the determination step the torque is calculated using a scaling factor ($p_z$) and/or a magnetic flux value ($\psi$) and a current (I), in particular by means of the formula $$T_{rq}=3/2(p_z)\cdot(\psi_{s\alpha}I_{s\beta}-\psi_{s\beta}I_{s\alpha}),$$

wherein $\psi_{s\alpha}$ represents a magnetic flux magnitude in the stator in the direction $\alpha$, $I_{s\beta}$ represents a current in the stator in the direction $\beta$, and wherein $\psi_{s\beta}$ represents a magnetic flux magnitude in the stator in the direction $\beta$, and $I_{s\alpha}$ represents a current in the stator in the direction $\alpha$.

5. The method according to claim 1, wherein in the calculation step the support value ($P_{cu2\_Trot}$) is calculated using a rotor resistance ($R_r$) and a first rotor current value ($I_{rd}$) and a second rotor current value ($I_{rq}$), in particular using the formula $P_{cu2\_Trot}=3/2\cdot R_r\cdot(I_{rd}^2+I_{rq}^2)$.

6. The method according to claim 5, wherein in the calculation step the rotor resistance is calculated using a basic electrical resistance value in the rotor ($R_{r20}$) and an adaptation factor, wherein the adaptation factor is calculated using a scaling value ($\alpha_r$) and the rotor temperature value ($T_{rot}$), and wherein the rotor resistance is calculated using the formula $R_r=R_{r20}\cdot(1+\alpha_r(T_{rot}-20))$.

7. The method according to claim 5, wherein in the calculation step the support value ($P_{cu2\_Trot}$) is calculated using a main inductance ($L_m$) and a rotor inductance ($L_r$), wherein a ratio of the main inductance to the rotor inductance is calculated as a function of characteristic curves and/or currents ($I_{sd}$) and ($I_{sq}$) in the stator.

8. The method according to claim 5, wherein in the calculation step the second rotor current ($I_{rq}$) is calculated using the main inductance ($L_m$) and the rotor inductance ($L_r$) and a current in the stator ($I_{sq}$), using the formula $I_{rq}=-(L_m/L_r)\cdot I_{sq}$.

9. The method according to claim 5, wherein in the calculation step the first rotor current ($I_{rd}$) is calculated using the rotor inductance ($L_r$) and a magnetic flux ($\psi_{rd}$) in the rotor and the main inductance ($L_m$) and a current ($I_{sd}$) in the stator, using the formula $I_{rd}=(1/L_r)\cdot(\psi_{rd}-L_m I_{sd})$.

10. The method according to claim 1, wherein in the determination step the auxiliary value ($P_{cu2\_Ref}$) is determined by multiplying the motor torque ($T_{rq}$) by the motor slip $\omega_{slip}$.

11. A device configured to carry out the method and/or to control the steps of the method according to claim 1.

12. The device according to claim 11, comprising computer-executable code that, when executed by the device, performs the method according to claim 1.

13. A non-transitory computer-readable medium comprising program instructions that are executable by a processor to determine a rotor temperature value ($T_{rot}$) of an electric machine, the program instructions comprising:

calculating a support value ($P_{cu2\_Trot}$) using a rotor temperature value ($T_{rot}$) determined with a temperature model, and a motor current value ($I_{sdq}$);

determining an auxiliary value ($P_{cu2\_Ref}$) using a motor torque ($T_{rq}$) and a motor slip value ($\omega_{slip}$);

linking the support value ($P_{cu2\_Trot}$) with the auxiliary value ($P_{cu2\_Ref}$) in order to obtain a corrected temperature value ($\text{Delta}_{Trot}$);

modifying the temperature model, using the corrected temperature value ($\text{Delta}_{Trot}$) in order to obtain a corrected temperature model; and determining the rotor temperature value ($T_{rot}$) using the corrected temperature model.

\* \* \* \* \*